United States Patent

Bronson

[15] 3,638,844
[45] Feb. 1, 1972

[54] CAR TOP CARRIER STRUCTURE WITH LOCKING MEANS

[72] Inventor: Joseph Bronson, 15397 Cruse Ave., Detroit, Mich. 48227

[22] Filed: Aug. 14, 1969

[21] Appl. No.: 850,185

Related U.S. Application Data

[63] Continuation-in-part of Ser. No. 732,378, May 27, 1968, Pat. No. 3,525,461.

[52] U.S. Cl. ....................................................224/42.1 F
[51] Int. Cl. .......................................................B60m 9/00
[58] Field of Search......................224/41.45, 42.1 B, 42.1 C, 224/42.1 E, 42.1 F

[56] References Cited

UNITED STATES PATENTS

| | | | |
|---|---|---|---|
| 3,132,780 | 5/1964 | Binding | 224/42.1 F |
| 3,239,115 | 3/1966 | Bott et al. | 224/42.1 F |

*Primary Examiner*—Gerald M. Forlenza
*Assistant Examiner*—Jerold M. Forsberg
*Attorney*—Hauke, Gifford and Patalidis

[57] ABSTRACT

A carrier structure for carrying articles above the roof of an automobile including a frame for the articles which mounts transversely of the roof by a pair of clamping devices that are attachable with the rain gutters along the sides of the roof. A key-operated lock on each clamping assembly prevents unauthorized removal of the carrier structure from the vehicle. In a second embodiment, a ski carrier is disclosed having a key-operated lock for securing the skis to the carrier and the carrier to the automobile.

15 Claims, 9 Drawing Figures

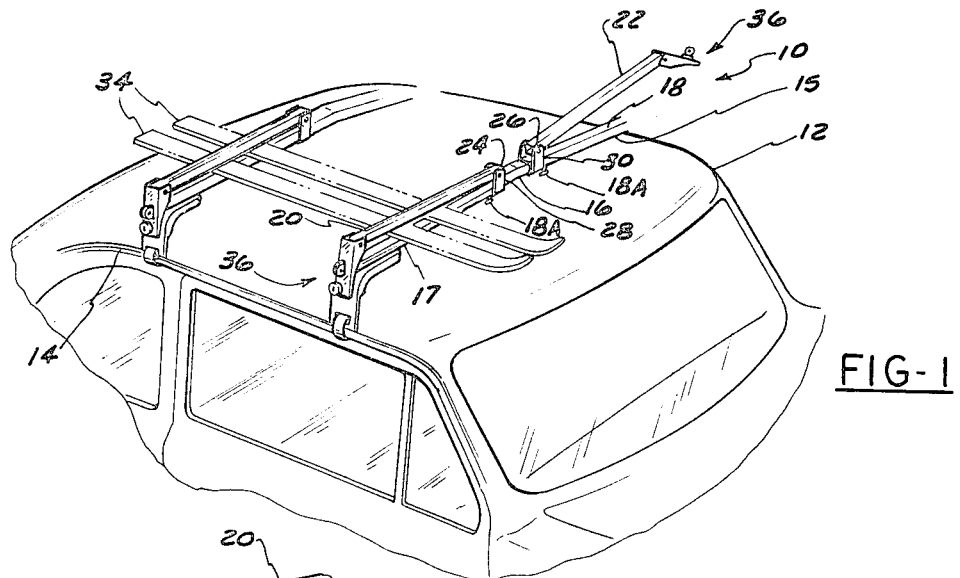
FIG-1
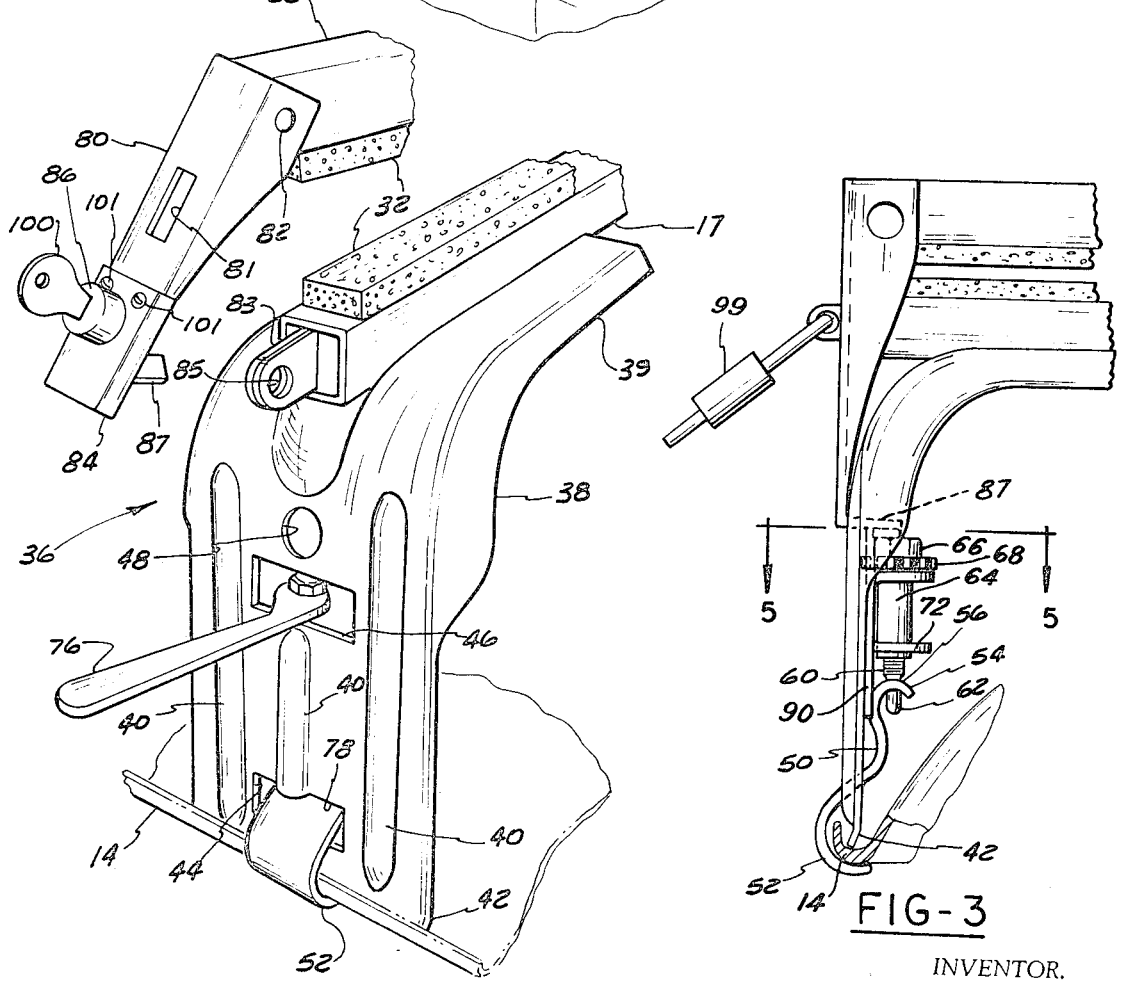
FIG-2
FIG-3
INVENTOR.
JOSEPH BRONSON

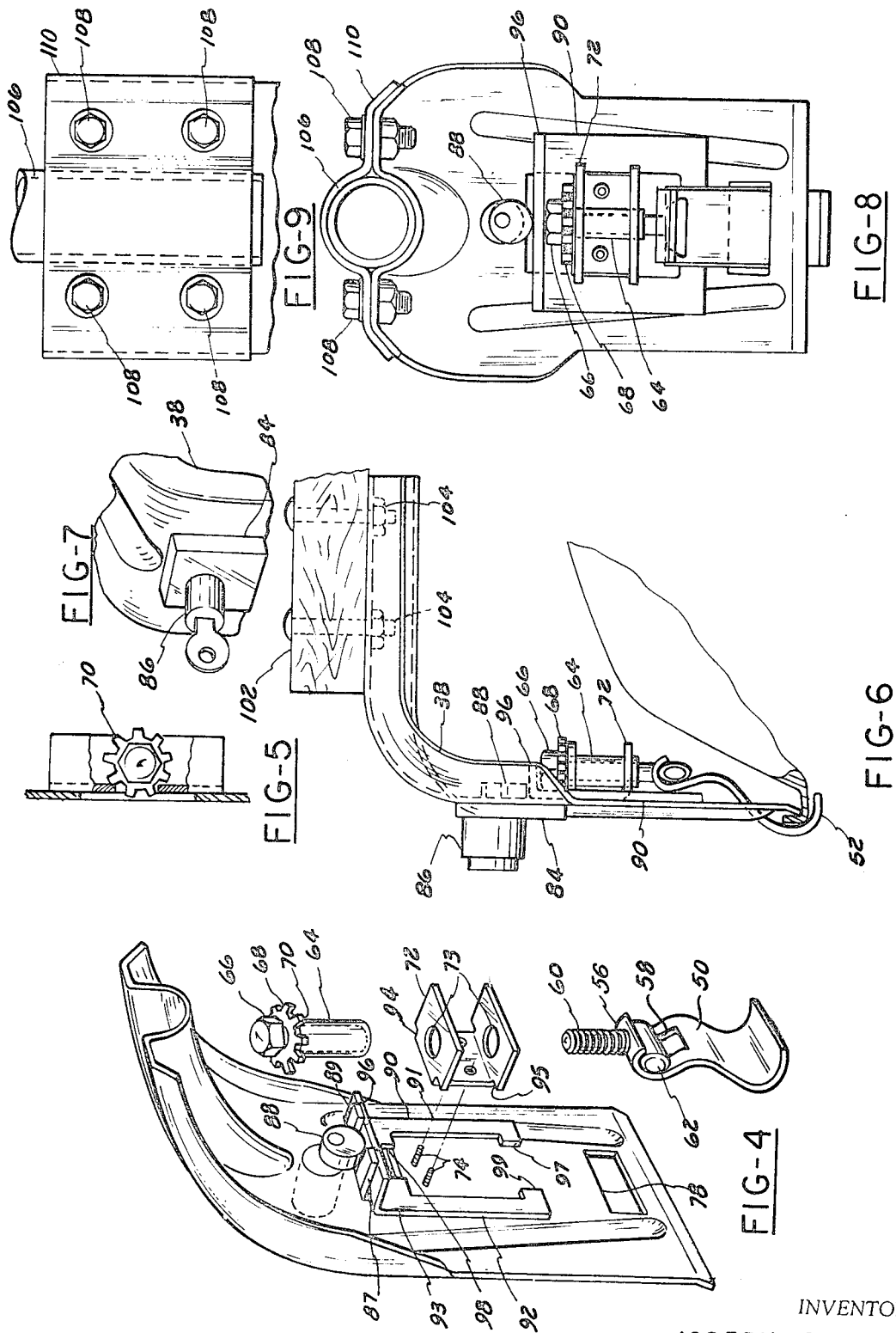

CAR TOP CARRIER STRUCTURE WITH LOCKING MEANS

CROSS-REFERENCE TO RELATED APPLICATIONS

This application is a continuation-in-part of application Ser. No. 732,378, filed May 27, 1968 now U.S. Pat. No. 3,525,461.

BACKGROUND OF THE INVENTION

1. Field of the Invention

This invention relates to carrier structures which are temporarily fastened to the exterior of a vehicle, and more specifically to a structure of this character having clamping means which are attachable to the vehicle with key-operated locking means for preventing the unauthorized detachment of the structure from the vehicle.

2. Description of the Prior Art

Numerous structures have been disclosed in the prior art for supporting articles on the exterior surfaces of an automotive vehicle. Normally the manner in which the structure is mounted depends on the article that is to be supported; for instance, car top carriers are mounted on the vehicle's roof to transport articles that cannot be accommodated within the interior of the vehicle. Other carrier structures are mounted on the deck lid of the vehicle to support skis, and the like, which are also of such a size that they cannot be readily accommodated within the interior of the vehicle.

One common problem with the conventional carrier structures has been related to providing a fastening device that can be inexpensively formed with a relatively few components to provide a firm connection between the structure and the vehicle. My aforementioned patent discloses such a fastening means in the form of a clamping device which is engageable with the rain gutters of a conventional automobile. The improved clamping devices are mounted in pairs, one on each side of the roof of the vehicle to support a car top carrier frame on which an article that is to be transported by the vehicle can be mounted.

A problem that has been related to ski carrier structures is that both the skis and the carrier structure are usually rather expensive. When attached to the roof of an unattended vehicle, they can be removed from the vehicle by unauthorized parties.

SUMMARY OF THE INVENTION

The broad purpose of the present invention is to provide a carrying structure mounted above the vehicle's roof and which is connected to the vehicle by a pair of clamping devices which engage the rain gutters along the side of the roof. The clamping devices are provided with key-operated locks, preventing the unauthorized removal of the carrying structure from the vehicle. In the embodiment of the carrying structure used to carry skis, the locks prevent the unauthorized removal of the skis from the structure, as well as preventing removal of the carrying structure from the vehicle.

The preferred ski-carrying embodiment of the present invention comprises a frame having a base member with a length which substantially corresponds to the distance between the rain gutters along the sides of the vehicle's roof. A clamping device, connected to each end of the base of the frame, is adapted to support the frame above the vehicle's roof. A pair of arms, each with one end pivotally mounted on the base member near its center, extend outwardly toward the ends of the base member.

Each clamping device comprises an elbow-shaped clamping member having the portion disposed in a horizontal plane connected to the end of the base member. The portion of the clamping member mounted in an upstanding position has its lower, clamping edge in the trough of the rain gutter. The upstanding part has an opening adjacent its lower edge in which is supported an elongated metal strap having its lower end formed into a hook. The hook extends outwardly through the opening and is engageable with the lower side of the rain gutter.

A pair of threaded fasteners, mounted on the inner side of the upstanding part are connected with the upper end of the strap so that when the hook is located against the lower side of the gutter, the fastening members can be tightened by a wrench, to pull the strap upwardly until the rain gutter is tightly clamped between the clamping edge and the hook. The frame is then rigidly mounted in place. A star washer, having radially extending spokes, is secured to the head of the upper fastener.

The upstanding part has an access opening to its inner side formed above the opening adjacent its lower edge for the wrench to engage the head of the upper fastener to either loosen or tighten the clamping hook. The upstanding portion also has a socket opening immediately above the access opening for receiving a key-operated lock. The lock is secured to the free end of a finger member that has the other end pivotally mounted to the free swinging end of the arm. A pair of inwardly extending lugs are also formed on the free end of the finger member. The lock has a disk-shaped cam eccentrically mounted on its inner end. A U-shaped latch, slidably mounted on the inner side of the upstanding part, has a flange along its upper edge extending inwardly from the upstanding portion. A slot is formed on the latch to form means for engaging the star washer when the latch is slid to its downward position, preventing the loosening of the fasteners. With the rain gutter tightly clamped between the hook and the clamping edge, the latch may be slid to its downward position. In the downward position, the latch covers the lower portion of the access opening, the portion forming the slot engages the star washer, and the flange of the latch rests on top of the upper fastener. The inner end of the lock may then be inserted into the socket opening, simultaneously with the insertion of the lugs into the upper portion of the access opening. The lugs maintain the latch in its downward position, preventing the unauthorized removal of the carrier from the vehicle. The eccentrically mounted cam may then be rotated downwardly. In its downward position, the cam prevents the removal of the lock from the socket opening, maintaining the lugs in engagement with the latch and the arm adjacent the base member, preventing the unauthorized removal of the skis from between the arm and the base member.

In a second embodiment, the arms and fingers are eliminated so that the lock is inserted or removed directly from the socket opening to lock the base member to the vehicle. An article to be carried may be then secured directly to the base member.

In summary, the preferred embodiment of the invention comprises a carrying structure mounted transversely of the vehicle's roof by a pair of clamping devices that can be quickly and easily attached to the rain gutter along the sides of the roof. In addition, a key-operated lock means on each of the clamping devices prevents the carrier from being removed from the roof. In the ski-carrying embodiment, the lock prevents both the carrier from being removed from the roof and the skis from being removed from the carrier by a party who does not have the proper key.

DESCRIPTION OF THE DRAWINGS

The description refers to the accompanying drawings in which like reference characters refer to like parts throughout the several views and in which:

FIG. 1 is a perspective view showing a preferred ski carrier structure connected to the rain gutters along the side of the roof;

FIG. 2 is an enlarged view of one end of the ski carrier structure;

FIG. 3 is a side view of the preferred clamping device with the key-operated lock mounted in the socket opening in its locked condition;

FIG. 4 is an inside view of the clamping device with parts of the device illustrated in an exploded relationship;

FIG. 5 is a view as seen along lines 5—5 of FIG. 3;

FIG. 6 is a side elevational view of a second embodiment of the clamping device with the key-operated lock mounted in its socket opening in its locked condition;

FIG. 7 is a view of one end of the second embodiment of the carrier structure with the key-operated lock mounted in the socket opening;

FIG. 8 is an inside view of the second embodiment of the carrier structure in the locked condition; and FIG. 9 is a top view of the carrier structure shown in FIG. 8.

DESCRIPTION OF THE PREFERRED EMBODIMENT

Referring to the drawings, FIG. 1 illustrates a preferred ski-carrying structure generally indicated at 10, supported above the roof of a conventional automotive vehicle 12, and connected to a pair of rain gutters 14, which run along the sides of the roof. The structure 10 includes a frame 15 which comprises an elongated base member 16 having a rectangular-shaped cross section and a length slightly less than the distance between the rain gutters. A pair of clamping supports 17 and 18, each having a rectangular-shaped cross section slightly larger than that of the base member 16, are slidably mounted over the two ends of the member 16 and held in position by bolts 18A threaded into the lower surface of the supports 17 and 18. The position of the supports 17 and 18 may be adjusted to allow for automobiles having different distances between their rain gutters. A pair of identical elongated arms 20 and 22, each having one end pivotally mounted on bolts 24 and 26 carried on tabs 28 and 30 attached to the clamping supports 17 and 18, extend outwardly from the inner ends of the supports 17 and 18 towards the outer ends thereof.

Referring to FIGS. 1 and 2, clamping supports 17 and 18 and arms 20 and 22 each have a strip of resilient material 32 (FIG. 2) secured to their opposing surfaces for clamping a pair of skis 34 therebetween.

Still referring to FIGS. 1 and 2, a pair of identical clamping devices, generally indicated at 36, are attached to the outer ends of the supports 17 and 18 for securing the frame 15 to the rain gutters 14 and also for attaching the free ends of arms 20 and 22 to the frame 15. As can best be seen in FIG. 2 each clamping device includes an elbowlike clamping member 38 having an upper horizontal portion 39 secured to one end of the support 17. The portion of the clamping member 38 mounted in an upstanding position has three vertical stiffening ribs 40 and a lower clamping edge 42 which is engageable with the trough of the rain gutter 14. The clamping edge 42 is slightly bent outwardly, as best seen in FIG. 3, in order to provide a better connection with the rain gutters of modern vehicles. Referring again to FIG. 2 the clamping member 38 has an opening 44 adjacent its lower clamping edge 42 and an access opening 46 formed above opening 44. A socket opening 48 is formed in the clamping member 38 immediately above the access opening 46. The clamping device 36 also includes a metal strap 50 (FIG. 3) which functions as a second, cooperating clamping member having its lower end formed into a hook 52 which is engageable with the lower side of the rain gutter 14, as shown in FIG. 3. The strap 50 is supported with its midsection extending through the opening 44 of the clamping member 38 so that the hook 52 is movable toward and away from the clamping edge 42, between a clamping position in which it engages the lower side of the gutter 14 and a release position in which it is spaced from the gutter and generally disposed adjacent the outer side of the clamping member 38. The upper end 54 of the strap 50 is normally disposed on the inner side of the clamping member 38 and bent into a hook-shaped section 56 having a slot 58 (FIG. 4) formed in the middle of the bend and extending parallel to the longitudinal axis of the strap.

Referring to FIGS. 3 and 4 fastener member 60 has a pair of laterally extending feet 62 on its lower end which are receivable in the hook 58 when they are parallel to the hook. Referring to FIG. 4, a second fastener member 64 has an elongated body threadably engaged with the fastener 60, a head 66 and a washer 68 disposed beneath the head 66 and secured as by welding thereto. The washer 68, hereinafter also referred to as a star washer, is formed with radially extending spokes 70. The washer 68 is seated on a U-shaped support member 72, which is secured to the inside surface of clamping member 38 by means of screws 74 immediately beneath access opening 46. The fastener 64 extends through openings 73 formed in member 72. Still referring to FIG. 4, a U-shaped latch 90 has legs 91 and 92 that extend downward from a body section 93 slidably mounted adjacent the inside surface of the clamping member 36 in slots 94 and 95 formed on the support member 72. A flange 96, formed on the upper end of the body 93, extends inwardly from the clamping members 38. A rectangular slot 98 is formed on the lower edge of the body 93 between the legs 91 and 92.

The latch 90 may be raised to its upper position allowing entry through the access opening 46. When the latch is in its upper position, inwardly extending tabs 97 and 99, formed on the free ends of legs 91 and 92, respectively, prevent the latch 90 from sliding off the support member 72. With the latch 90 in its upper position, a wrench 76 may be inserted through access opening 46 to engage the head 66, as shown in FIG. 2, providing means for applying an effort on the fastener 64 for either clamping or releasing the device from the gutter 14. When the fastener 64 is rotated in one direction, the feet 62 are prevented by the hook-shaped end 54 from rotating so that they draw the strap 50 upwardly, which causes the hook 52 to tightly engage the lower side of the gutter 15 below the clamping edge 42. As the strap 50 is drawn upwardly, its back side abuts the clamping member 38 along edge 78 of opening 44 so that the hook 52 is rigidly held in position. By rotating the fastener member 64 in its reverse direction, the feet 62 of the lower fastener are moved away from the head 66, allowing the hook 52 to be moved away from the edge 42 of the clamping member 38 and to be separated from the gutter 14 so that the clamping device can be detached from the vehicle. If the wrench 76 is not available, the fastener 64 may be tightened or loosened by means of a screwdriver inserted through the access opening 46 to turn the star washer 68, which, in turn, rotates the fastener 64.

A finger 80, as shown in FIG. 2, has one end pivotally mounted by means of a bolt 82 on the free end of arm 20. As shown in FIGS. 2 and 4, a pair of inwardly extending lugs 87 and 89 are formed on the free end of the finger 80. An extension arm 84, secured to the free end of the finger 80, as by screws 101 or other conventional means, carries a key-operated lock 86 having a disk-shaped, eccentrically mounted cam 88 (FIG. 4) on its inner end.

With the hook 52 tightly engaging the lower side of the gutter 14, the latch 90 can be moved to its downward position with the flange 96 resting on the top of the head 66. In its downward position, the body 93 of the latch 90 blocks the lower portion of the access opening 46 and the sides forming the slot 98 engage the spokes 70 of the star washer 68 preventing the washer from turning. Thus, with the latch 90 in its downward position, as shown in FIGS. 3 and 5, access to the fastener 64 is blocked and rotation of the fastener 64 to loosen the clamping device 36 is prevented by the engagement of the slot 98 and the spokes 70. A pair of skis 34 may then be placed between the support 17 and the arm 20 and the arm pulled downward until the opening 81 formed in finger 80 is in position for the insertion of projection 83 therethrough.

The inner end of the lock 86 is then inserted into the socket opening 48, with the lugs 87 and 89 being simultaneously inserted into the upper portion of the access opening 46 that is not blocked by the latch 90. In this position, the lugs 87 and 89 engage the flange 46 to maintain the latch 90 in its downward position, preventing the fastener 64 from being rotated. Further, the extension 84 blocks the openings 46 and 48, preventing the unauthorized insertion of a tool therein to rotate the fastener 64.

A key 100, which may be separably joined to the lock 86, is operative to rotate the eccentrically mounted cam 88 (FIG. 4)

approximately 180° from an unlocked position to a locked position. With the lock positioned in the access opening 48, the key 100 is rotated so that cam 88 moves downward engaging the flange 96 of the latch 90 to further hold the latch in its downward position. With the cam 88 rotated to the locked position, as shown in FIG. 4, the cam 88 engages clamping member 38 preventing removal of the lock 86 from the socket opening 48. In the locked condition, the arm 20 is held in place by the lock 86, preventing the unauthorized removal of the skis 34 from the ski carrier. Further, the lock 86 maintains the lugs 87 and 89 in engagement with the flange 96 to maintain the latch 90 in its downward position, preventing the clamping device 36 from being removed from the automotive vehicle 12.

The key 100 can then be separated from the lock 86 leaving the clamping device in its clamped position and locked against removal. The insertion of the proper key in the lock 86 to rotate the eccentrically mounted cam 88 in the opposite direction allows the lock 86 to be removed from the socket opening 48. The key 100 has a coded contour in the conventional manner so that a party not having a similarly contoured key cannot operate the lock and thereby release the clamping device 36 from the vehicle.

It is to be noted that the extension 84 and the lock 86 may be removed from the finger 80 by removing the screws 101 and the clamping device can then be used with a conventional padlock 99, as is shown in FIG. 3. With the hook 52 tightly engaging the lower side of the gutter 14, the finger 80 is rotated downward and the lugs 87 and 89 inserted into the access opening 46 to maintain the latch 90 in its downward position. An arm of the lock 99 is then inserted through the opening 85 formed in projection 83 and the lock secured. In this condition, the lock 99 prevents the finger 80 from being disengaged from the projection 83, preventing the arm 20 from being raised and the skis 34 from being removed. Further, the lock 99 prevents the lugs 87 and 89 from being disengaged from the latch 90, maintaining the device 36 in its clamped position.

In summary, the carrying structure 10 is placed transversely across the roof of the vehicle 12 with the clamping edge 42 being placed in the trough of the rain gutter 14. The hook 52 of the strap 50 is placed around the lower side of the gutter 14. The fasteners 60 and 64 are then threaded together with the aid of the wrench 76 through the access opening 46, drawing the strap 50 upwardly causing the hook 52 to tightly engage the lower side of the gutter 14. In this position, the clamping device 36 is rigidly secured to the vehicle 12.

The latch 90 may then be pushed to its downward position so that the flange 96 rests on the head 66, the body 93 of the latch 90 covers the access opening 46 and slot 98 engages the spokes 70 of the washer 68 preventing the fastener 64 from being turned. A pair of skis 34 may be placed on the support 17 and the arm 20 pulled down on top of the skis. The inner end of the lock 86 is then inserted through the socket opening 48, with the lugs 87 and 89 being inserted into opening 46 to engage the flange 96, maintaining the latch 90 in its downward position. The cam 88 is rotated downward to its locked position, engaging the top of the flange 96 to further aid in maintaining the latch 90 in its downward position. With the cam in the locked position, the engagement of the cam 88 with the clamping member 38 prevents the removal of the lock 86 from the socket opening 48, maintaining the arm 20 adjacent the support 17 to prevent the unauthorized removal of the skis 34 from the carrier. The latch 90 maintained in its downward position by the lugs 87 and 89 prevents the unauthorized removal of the carrying structure 10 from the vehicle 12.

A second embodiment is shown in FIGS. 6–9, wherein parts already described are similarly numbered. The locking device in the second embodiment is similar to the locking device as previously described herein, except that the arm 20 and the finger 80 with the lugs 87 and 89 have been removed. When the hook 52 is tightly engaging the lower surface of the gutter 14 and the latch 90 is in its downward position, the key-operated lock 86 mounted on the projection 84 is inserted into the socket opening 48. The cam 88 may then be rotated to its locked position, engaging the flange 96 on the latch 90 to maintain the latch in its downward position. In the locked position, the cam 88 engages the clamping member 38, preventing the lock 86 from being removed from the socket opening 48.

As shown in FIG. 6, the clamping member 38 may be secured to the end of a wooden base member 102 by means of nuts and bolts 104. Alternatively, the clamping member 38 may be secured to the end of a metal tubular base member 106 as shown in FIGS. 8 and 9 by means of bolts 108 and a clamping plate 110. If it is desired to place the carrier on cars having different lengths between the rain gutters, the bolts 108 may be loosened and the position of clamping member 38 on base member 106 may be shifted to allow for the difference in distance between the rain gutters. The article to be transported by the carrier may be secured to the base member 102 or 106 by any convenient means.

It will be noted that the lock 86 with the projection 84 is interchangeable between the ski carrier and the carrier shown in FIGS. 6–9.

The carriers, illustrated in FIGS. 6–9, may also be utilized without the lock 86. Although without the lock 86 the latch 90 would not be effective to prevent the unauthorized removal of the carrier from the motor vehicle, the latch 90 would still engage the star washer 68 to prevent self-loosening of the fastener 64.

Thus, it is understood that I have described several embodiments of a novel carrier structure that can be mounted on the roof of a vehicle and firmly clamped to the rain gutters on each side of the roof. Key-operated locking means on the clamping means prevent an unauthorized party from removing the carrier from the vehicle. In one embodiment, the key-operated locking means prevents the unauthorized removal of the carrier from the vehicle and further prevents the unauthorized removal of skis from the carrier structure.

Having thus described the invention by way of typical examples thereof, what is sought to be protected by the United States Letters Patent is as follows:

I claim:

1. A theftproof clamping assembly for mounting a cargo carrier to the roof of an automotive vehicle having a rain gutter along a lateral side of the roof, said clamping assembly comprising:

a first clamping member having a lower clamping edge engageable with the trough of the rain gutter;

a second clamping member movably mounted on said first clamping member and having a clamping section engageable with the lower surface of the rain gutter;

fastener means movably mounted between said first and second clamping members for motion between a first position in which said fastener means maintains said second clamping member in a position securely engaging the lower surface of the rain gutter, and a second position in which said fastener means allows said second clamping member to be disengaged from the lower surface of the rain gutter;

a latch slidably mounted on said first clamping member for motion between a first position in which said latch prevents movement of said fastener means from its first position when said fastener means is in its first position, and a second position in which said latch allows movement of said fastener means between its first and second position; and a key-operated lock on said first clamping member having an element movable by operation of the lock by a key which separates from the lock between a first position in which said element is operative to prevent motion of said latch from its first position, and a second position in which said element is inoperative to prevent motion of said latch between its first and second positions.

2. The invention as defined in claim 1, wherein said fastener means includes a first and second threaded member, said first threaded member having its lower portion connected to the upper end of said second clamping member, said second threaded member being rotatably mounted on said first clamping member and having its lower portion threadably engaging the upper portion of said first threaded member, whereby rotation of said second threaded member in a first direction moves said second clamping member toward the lower surface of the rain gutter, and rotation of said second threaded member in a second direction allows said second clamping member to be separated from the lower surface of the rain gutter.

3. The invention as defined in claim 2, wherein said second threaded member is engageable with a tool for applying an effort effective to move said member in its first and second directions.

4. The invention as defined in claim 3, wherein said latch prevents the engagement of said tool with said second threaded member when said latch is in its first position.

5. The invention as defined in claim 2, including a washer having radially extending spokes fixedly secured to said second threaded member, and said latch being formed with a slot for engaging said spokes when said latch is in its first position.

6. The invention as defined in claim 1, wherein said first clamping member has a generally flat portion with said lower clamping edge formed thereon and an opening spaced above said lower clamping edge; said second clamping member comprises an elongated substantially rigid strap having one end bent to form a hook and its opposite end adapted for connection to said fastener means, said strap being movably supported in said opening in said first clamping member with said hook substantially on the outer side of said first clamping member and the opposite end of said strap being on the inner side of said first clamping member; said fastener means including a first and second threaded member, said first threaded member having its lower end connected to the upper end of said strap, said second threaded member being rotatably mounted on said first clamping member and having its lower end threadably engaged with the upper end of said first threaded member; a washer having radially extending spokes secured to the upper end of said second threaded member; and said latch being formed with a slot for engaging said spokes to prevent rotation of said second threaded fastener when said latch is in its first position.

7. The invention as defined in claim 6, including an access opening formed in said first clamping member adjacent the top of said second threaded member for insertion of a tool engageable with the top end of said second threaded member for rotating said member, said access opening being blocked by said latch when said latch is in its first position; and a socket opening formed in said first clamping member above said access opening for insertion of the portion of said lock containing said element, said element preventing the removal of said lock from said socket opening when in its second position.

8. A carrier for securing an article above the roof of a vehicle, said vehicle having edge portions extending along each lateral side of the roof, said carrier comprising,
 a frame;
 means securing one end of said frame to a first of the edge portions;
 a first clamping member connected to the other end of said frame and engageable with the second edge portion;
 a second clamping member having a clamping section engageable with the second edge portion and mounted on said first clamping member for motion between a first position in which the second clamping member cooperates with the first clamping member to attach the first clamping member to the second edge portion, and a second position in which the second clamping member allows the first clamping member to be detached from the second edge portion;
 an arm member having one end pivotally mounted on said frame for movement between a first position in which said arm member is operative to secure an article between said arm and said frame, and a second position in which said arm member is inoperative to secure an article between said arm member and said frame;
 a key-operated lock connected to said arm member and engageable with said first clamping member when said arm member is in its first position, said lock having an element movable, by operation of the lock by a key which separates from the lock, between a first position in which said element is operative when said lock is engaged with said first clamping member to prevent motion of the second clamping member from its first position when engaged with the second edge portion and to prevent said arm member from being moved from its first position and a second position in which said element is inoperative to prevent motion of said second clamping member from its first position; and
 a first and second threaded fastener, said first threaded fastener having its lower end connected to said second clamping member, said second threaded fastener being rotatably mounted on said first clamping member and having its lower end threadably engaging the upper end of said first threaded fastener for moving said second clamping member between its first and second positions.

9. A theftproof clamping assembly for mounting a cargo carrier to the roof of an automobile vehicle, said vehicle having a rain gutter along a lateral side of the roof, said clamping assembly comprising
 a first clamping member having a lower clamping edge engageable with the trough of the rain gutter;
 a second clamping member movably mounted on said first clamping member and having a clamping section engageable with the lower surface of the rain gutter;
 fastener means movably mounted between said first and second clamping members for motion between a first position in which said fastener means maintains said second clamping member in a position securely engaging the lower surface of the rain gutter, and a second position in which said fastener means allows said second clamping member to be disengaged from the lower surface of the rain gutter;
 a latch mounted on said first clamping member for a motion between a first position in which said latch engages said fastener means and prevents movement of said fastener means from its first position when said fastener means is in its first position, and a second position in which said latch allows movement of said fastener means between its first and second positions; and
 lock means on said first clamping member having an element movable between a first position in which said element is operative to prevent motion of said latch from its first position, and a second position in which said element is inoperative to prevent motion of said latch between its first and second positions.

10. The invention as defined in claim 8, including a washer having radially extending spokes secured to said second threaded fastener; and a latch having a slot formed therein for engaging said spokes slidably mounted on said first clamping member for motion between a first position in which said slot engages said spokes to prevent rotation of said second threaded member, and a second position in which said latch is inoperative to prevent rotation of said second threaded member.

11. The invention as defined in claim 10, including a finger member having a lug member formed on one end pivotally mounted on the free end of said arm; and said lock is mounted on said finger adjacent said lug member, said lug member being operative to maintain said latch in its first position when said lug member is engaged with said first clamping member, and said lock element is operative to maintain said lock and said lug member engaged with said first clamping member when said lock element is in its first position.

12. The invention as defined in claim 11, including an access opening formed in said first clamping member adjacent the top of said second threaded member for insertion of said lug member; and a socket opening formed in said first clamping member above said access opening for insertion of the portion of said lock containing said lock element, said lock element preventing the removal of said lock from said socket opening when said lock element is in its first position.

13. A carrier for a motor vehicle having a roof and edge portions extending along each lateral side of the roof, said carrier comprising:
   a frame;
   means securing one end of said frame to a first of the edge portions;
   a first clamping member connected to the other end of said frame and engageable with the second edge portion;
   a second clamping member having a clamping section engageable with the second edge portion and mounted on said first clamping member for motion between a first position in which the second clamping member cooperates with the first clamping member to attach the first clamping member to the second edge portion, and a second position in which the second clamping member allows the first clamping member to be detached from the second edge portion;
   an arm member having one end pivotally mounted on said frame for movement between a first position in which said arm is operative to secure an article between said arm and said frame, and a second position in which said arm is inoperative to secure an article between said arm and said frame;
   a finger member having one end pivotally mounted on said arm member and a lug means formed thereon for movement between a first position when said arm is in its first position in which said lug means engages said first clamping member and is operative to maintain said second clamping member in its first position, and a second position in which said lug means is disengaged from said first clamping member and is inoperative to maintain said second clamping member in its first position; and
   a tab member formed on said frame and engageable with said finger member when said finger member is in its first position for securing said finger member in its first position when said tab member is engaged by a lock.

14. The invention as defined in claim 13, wherein said finger member is formed with an aperture therethrough, and said tab member has one end secured to said frame and an aperture formed in the other end, said tab member projecting through said finger member aperture when said finger member is in its first position.

15. A carrier for securing an article above the roof of a vehicle, said vehicle having edge portions extending along each lateral side of the roof, said carrier comprising
   a frame;
   means securing one end of said frame to a first of the edge portions;
   a first clamping member connected to the other end of said frame and engageable with the second edge portion;
   a second clamping member having a clamping section engageable with the second edge portion and mounted on said first clamping member for motion between a first position in which the second clamping member cooperates with the first clamping member to attach the first clamping member to the second edge portion, and a second position in which the second clamping member allows the first clamping member to be detached from the second edge portion;
   an arm member having one end pivotally mounted on said frame for movement between a first position in which said arm is operative to secure an article between said arm member and said frame, and a second position in which said arm member is inoperative to secure an article between said arm member and said frame; and
   lock means connected to said arm member and having an element movable between a first position in which said element engages with said second clamping member when said arm member is in said first position and prevents motion of the second clamping member from its first position and also engages said arm member with said first clamping member to prevent said arm member from being moved from its first position.

* * * * *